UNITED STATES PATENT OFFICE.

ERNST AUGUST GROTE, OF FREUDENBERG, NEAR SIEGEN, PRUSSIA, GERMANY.

SUBSTITUTE FOR COFFEE.

SPECIFICATION forming part of Letters Patent No. 271,332, dated January 30, 1883.

Application filed July 15, 1882. (No specimens.) Patented in Germany April 27, 1880, No. 13,070; in Belgium January 19, 1881, No. 53,112, and in France October 29, 1881, No. 144,345.

*To all whom it may concern:*

Be it known that I, ERNST AUGUST GROTE, of Freudenberg, near Siegen, Prussia, Germany, have invented a Substitute for Coffee, of which the following is a specification.

My improved preparation does not contain anything of a disagreeable flavor or injurious to health. It is in taste and color very much like the Indian coffee, though it has nothing of the exciting character of coffee.

I obtain the mixture by roasting and grinding rye bread or the dough of rye and mixing eighteen parts, by weight, of it with six parts, by weight, of roasted and ground rye-grains, adding roasted and ground cacao-shells and coffee-beans *ad libitum*, one part, by weight, of bicarbonate of soda, and eighteen parts of caramel. This caramel consists in twelve parts, by weight, of molasses, twelve parts, by weight, of turnip-leaves, three parts, by weight, of sugar, and one part, by weight, of carbonate of ammonium.

The rye bread roasted to a dark brown gives excellent properties to the preparation. By the fermentation of the dough, alcohol and carbonic acid are formed, while part of the amylum changes into dextrine, glucose, (sugar,) and in a slight degree into lactic acid. The formation of dextrine, being continued under the heat of the oven, changes into formation of sugar, and, finally, by the process of roasting, into formation of caramel, whereby the bread acquires also the agreeable bitterness.

By adding roasted rye, as stated above, the strong taste of the roasted bread is softened, and the addition of the roasted cacao-shells and coffee makes the preparation quite equal to the Indian coffee. The object of adding caramel is to obtain a strong and dark-colored beverage. The bicarbonate of soda, dissolving easily all soluble substances of the preparation, still contributes to the strength and color. By adding carbonate of ammonium to the molasses and sugar I obtain a darker and stronger caramel, dissolving easily, which would not be the case if the carbonate were omitted.

I claim as my invention—

A substitute for coffee, consisting of eighteen parts, by weight, of roasted and ground rye bread or dough of rye, and six parts, by weight, of roasted and ground rye-grains, with roasted and ground cacao-shells and coffee-beans *ad libitum*, one part, by weight, of bicarbonate of soda, and eighteen parts of caramel, consisting of twelve parts, by weight, of molasses, twelve parts, by weight, of turnip-leaves, three parts, by weight, of sugar, and one part, by weight, of carbonate of ammonium.

In testimony whereof I have signed my name to this specification in the presence of two subscribing witnesses.

ERNST AUGUST GROTE.

Witnesses:
ARTHUR GODDE,
GUSTAVE A. DITTMAR.